United States Patent [19]

Minamide et al.

[11] 4,321,287
[45] Mar. 23, 1982

[54] METHOD OF PRODUCING THERMOLUMINESCENCE DOSIMETER ELEMENT

[75] Inventors: Seiko Minamide, Nara; Makoto Okuda, Hirakata; Shinobu Nakata, Osaka; Tadahiro Fukui, Moriguchi, all of Japan

[73] Assignee: Matsushita Electric Industrial Co., Ltd., Osaka, Japan

[21] Appl. No.: 147,311

[22] Filed: May 6, 1980

[30] Foreign Application Priority Data

May 7, 1979 [JP] Japan .................................. 54/55451
Jun. 19, 1979 [JP] Japan ........................... 54/84019[U]

[51] Int. Cl.³ ........................ B05D 1/12; B05D 1/32; C09K 11/00
[52] U.S. Cl. .................................... 427/157; 250/484
[58] Field of Search ........................ 427/157; 250/484

[56] References Cited

U.S. PATENT DOCUMENTS 3,471,699 10/1969 McCall ............................. 250/484

*Primary Examiner*—James R. Hoffman
*Attorney, Agent, or Firm*—Spencer & Kaye

[57] ABSTRACT

A thermoluminescence dosimeter element including an adhesive coating formed in a predetermined thickness on a base tape, and particles of thermoluminescent material sprayed onto the surface of the adhesive coating. Such thermoluminescence dosimeter element is produced by a method including a first step of spreading into an adhesive coating of a small thickness an adhesive agent applied in drops to the surface of a base tape, a second step of spraying particles of thermoluminescent material onto the surface of the adhesive coating through one of openings formed in a masking tape operatively brought into contact with the base tape, and a third step of drying the adhesive coating to ensure that the particles of the thermoluminescent material firmly adhere to the base plate. The method enables thermoluminescence dosimeter elements of high sensitivity and reliable performance to be produced continuously on a mass production basis.

3 Claims, 14 Drawing Figures

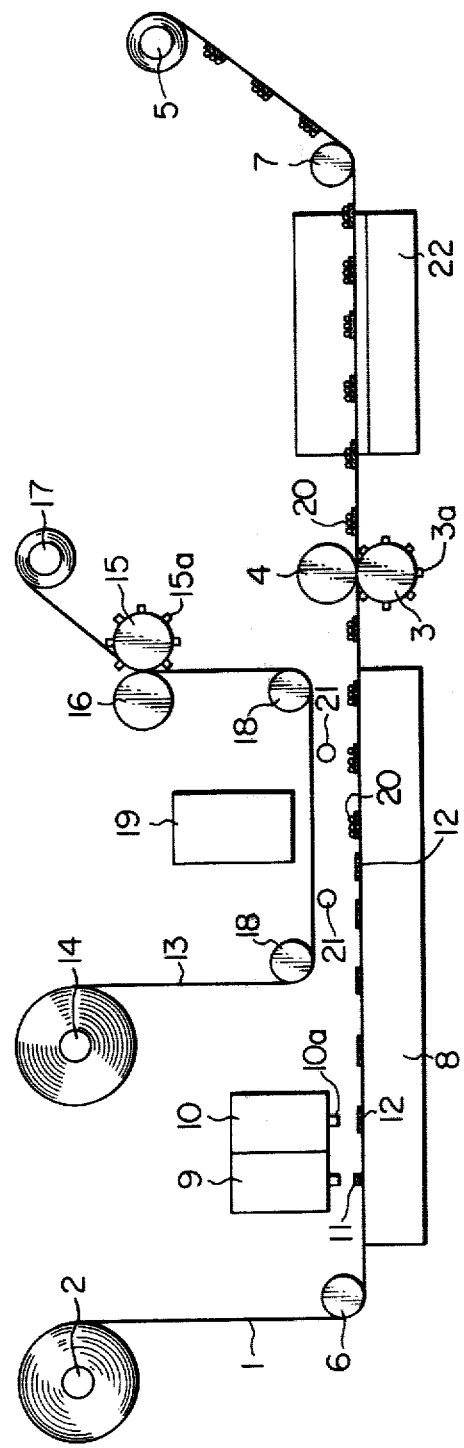
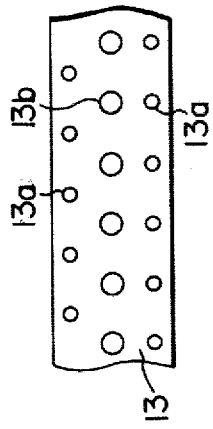
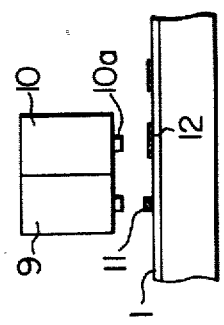

METHOD OF PRODUCING THERMOLUMINESCENCE DOSIMETER ELEMENT

This invention relates to a thermoluminescence dosimeter element for measuring the dose of a radiation exposure and a method of producing the same.

A thermoluminescence dosimeter element is used for measuring the dose of a radio-active exposure. This element is carried by an operator who manipulates equipments dealing with radio-active rays, when the operator engages in an operation concerning radio-active rays. The element generates thermoluminescence in an amount which is proportional to the dose of a radio-active exposure, when it is set on a measuring device and heated by, for examples, a hot air or an infrared rays, etc. The generated thermoluminescence is detected by a photo-electric multiplier which produces an electrical signal in proportion to the amount of the generated thermoluminescence. Therefore, it is possible to obtain a measurement of the dose of the radio-active exposure.

In one method, known in the art, for producing a thermoluminescence dosimeter element, a mixture of an adhesive agent and a thermoluminescent material is applied to the surface of a base sheet, the coat of the mixture applied is dried, and each element is stamped out from the base sheet. Some disadvantages are evaluated in this method. When a mixture of adhesive agent and a thermoluminescent material is used, the major portion of the thermoluminescent material would be burried in the adhesive agent, and therefore the thermoluminescence dosimeter element produced by this known method would be low in sensitivity. Also, difficulties would be experienced in obtaining a uniform mixture of an adhesive agent and a thermoluminescent material and applying the mixture on a base sheet in even thickness. This would result in that the thermoluminescence dosimeter elements produced by this known method have not uniform sensitivites each other, and therefore, cannot be expected to their uniform and stable performance. Thus, it has been hardly possible to produce thermoluminescence dosimeter elements of reliable performance in a continuous production line.

The present invention is to obviate the aforesaid disadvantages of the prior art.

Accordingly, an object of the invention is to provide a thermoluminescence dosimeter element of high sensitivity and stable performance.

Further, another objects of the invention is to provide a method of producing such elements.

Thus, according to the method of the invention, a thermoluminescent material is sprayed through a masking tape having apertures to a coat of adhesive agent applied to the surface of a base tape in drops, and the adhesive agent and the thermoluminescent material are dried in a furnance to permit the thermoluminescent material to firmly adhere to the base tape.

Further objects, features and advantages of the invention will become more clear from the following description of the preferred embodiments taken in conjunction with the accompanying drawings, in which:

FIG. 1 is a view in explanation of one embodiment of the present invention;

FIG. 2 is a plan view of the base tape;

FIG. 3 is view in explanation of the first step of the method comprising one embodiment of the present invention;

FIG. 4 is a plan view of the masking tape;

Figure 5A:
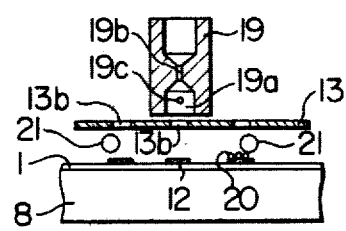
FIGS. 5a through 5d are views in explanation of the second step.
Figure 5B:
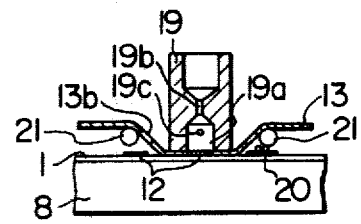
Figure 5C:
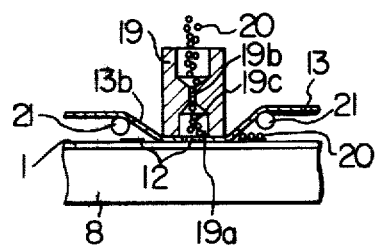
Figure 5D:
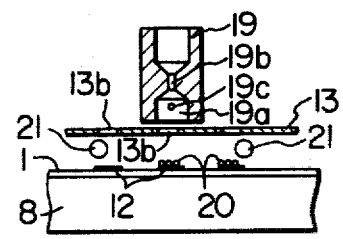

First, one example of a device suitable for carrying out the method according to the invention will be described by referring to the accompanying drawings.

Referring to FIG. 1, a base tape 1 made of heat-resistant material, having in opposite side edge portions perforations 1a as clearly shown in FIG. 2, is wound in a roll on a supply reel 2. A sprocket wheel 3 is arranged to intermittently feed the base tape 1 with its teeth engaging the perforations 1a. A roller 4 pressingly engages with the sprocket wheel 3 so as to prevent the base tape 1 from coming off from the sprocket wheel 3. The base tape 1 is wound on a take-up reel 5 downstream of the sprocket wheel 3. Two guide rollers 6, 7 are disposed on the side of the supply reel 2 and on the side of the take-up reel 5, respectively, so as to guide the base tape 1 fed by the sprocket wheel 3. Between the guide roller 6 and the sprocket wheel 3 the base tape 1 is horizontally and slidingly moved on a tape quick table 8. An adhesive agent dispenser 9 intermittently supplies a predetermined amount of an adhesive agent in a drop to the surface of the base tape 1. The drop of the adhesive agent 11 on the base tape 1 is spread by a block 10a of a spreader 10 so as to be changed into an adhesive coating 12 having a uniform thickness laid on the surface of the base tape 1.

Reference numeral 13 denotes a masking tape having in the opposite side portions thereof perforations 13a and in the central portion thereof apertures 13b of the same shape as thermoluminescence dosimeter elements to be produced, the perforations 13a and the apertures 13b being spaced equi-distantly as clearly shown in FIG. 4, reference numeral 15 denotes a sprocket for intermittently feeding the masking tape 13 with its teeth 15a engaging the perforations 13a of the masking tape 13, and reference numeral 14 denotes a supply reel onto which the masking tape 13 is wound in a roll. A roller 16 is pressingly engaged to the sprocket 15 so as to prevent the masking tape from coming off from the sprocket 15. The masking tape 13 is wound on a take-up reel 17 downstream of the sprocket 15. Two guide rollers 18 are positioned on the side of the supply reel 14 and on the side of the take-up reel 17, respectively. The masking tape 13 is horizontally extended between the guide rollers 18. A sprayer 19 is disposed above the horizontally extended portion of the masking tape 13. The sprayer 19 comprises a spray nozzle 19a for spraying a thermoluminescent material 20, a discharge orifice 19b, communicating with the spray nozzle 19a and a recovery port 19c communicated with the spray orifice 19a, for withdrawing an excess amount of the thermoluminescent material 20, as clearly shown in FIGS. 5a through 5d. The sprayer 19 moves vertically in synchronism with the movement of the base tape 1 as well as the masking tape 13. Two stripper pins 21 are disposed upstream and downstream of the sprayer 19, respectively, and underneath the horizontally extended portion of the making tape 13 between the two guide rollers 18. The stripper pins 21 are arranged to prevent the masking tape 13 from contacting to two adhesive coatings 12 upstream and downstream adjacent to the sprayer 19 when the latter moves downwardly so as to drive the masking tape 13 against the base tape 1 of the portion just under the sprayer 19. Further, these stripper pins 21 facilitate the stripping of the masking tape 13 adhered to the coating 12 right under the sprayer 19, from the base tape 1.

A drying furnance 22 is interposed between the sprocket wheel 3 and the guide roller 7, which includes heaters disposed above and below the path of the plate 1 in order to heat and dry the adhesive coatings 12 applied to the surface of the base tape 1 and the thermoluminescent material layers 20 formed on the adhesive coatings 12, so as to allow the thermoluminescent material layers 20 to firmly adhere to the base tape 1.

A series of steps of the method according to the invention, for producing the thermoluminescence dosimeter element by using the apparatus shown in FIG. 1 will now be described. The adhesive agent 11 is applied to drop to the base tape 1 which is moved intermittently by the sprocket wheel 3, from the adhesive agent dispenser 9 which operates in synchronism with the movement of the base tape 1 so that the drops of the adhesive agent are equidistantly spaced. The adhesive agent dropped onto the surface of the base tape 1 is spread into the adhesive coating 12 of a predetermined thickness by the block 10a of the spreader 10 which is disposed in a position spaced apart from the position where the adhesive agent 11 is dropped, at a distance corresponding to one pitch or a plurality of pitches of the teeth 3a of the sprocket wheel 3. Then the adhesive coating 12 formed on the surface of the base tape 1 is moved intermittently to a position beneath the sprayer 19 spaced apart from the block 10a of the spreader 10 at a distance corresponding to a plurality of pitches of the teeth 3 of the sprocket wheel 3 [See FIG. 5a]. At this time, the sprayer 19 moves downwardly and the masking tape 13 below the sprayer 19 is brought into contact with the base tape 1 [See FIG. 5b], so that the thermoluminescent material 20 is discharged through the discharge orifice 19b into the spray nozzle 19a from which the thermoluminescent material 20 is sprayed. Thus, the thermoluminescent material 20 is applied to the surface of the adhesive coating 12 exposed through one of the apertures 13b in the masking tape 13, and any excess material 20 which does not adhere to the adhesive coating 12 is withdrawn through the recovery port 13c. [See FIG. 5c]. Then, the sprayer 19 moves upwardly to allow the masking tape 13 to be released from contact with the base tape 1, by the resilience of the masking tape 13 or by a rearwardly directed tension exerted to the masking tape 13 by momentarily rotating the supply reel 14 in the reverse direction. In this way, the base tape 1 is released from contact with the masking tape 13 [See FIG. 5d], and the two tapes 1 and 13 are moved intermittently a distance corresponding to one pitch of the teeth 3a of the sprocket wheel 3 [See FIG. 5a].

Figure 6:
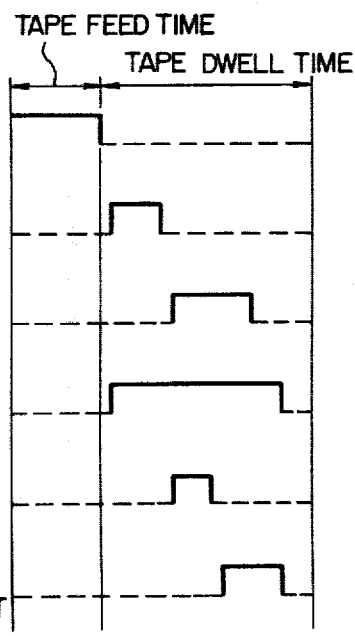
FIG. 6 is a timing chart for the first step and the second step.

The base tape 1 formed on its surface with a plurality of thermoluminescent material layers 20 with the adhesive coatings 12 is passed through the drying furnace 22 to dry the adhesive coatings 12 and the thermoluminescent material layers 20. Finally, the base tape 1 having the thermoluminescent material layers 20 adhered to its surface is wound on the take-up reel 5. FIG. 6 is a timing chart showing one example of sequential operations of the components of the apparatus for performing the aforesaid series of the process steps. By repeating these operations in chronological sequence, the thermoluminescence dosimeter elements can be continuously produced.

In the apparatus shown in FIG. 1, the spreader 10 and the adhesive agent dispenser 9 may be integrated into a single device so that the adhesive agent may be dropped and spread in the same position. Also, regulating pins may be used, which is arranged to be inserted in the perforations 13a and 1a of the masking tape 13 and the base tape 1, respectively, so as to regulate the relative positions of the two tapes 13 and 1.

In the embodiment shown and described hereinabove, the adhesive agent applied in drops to the surface of the base tape 1 is spread on the surface of the base tape 1 by using the blocks 10a to press against the base plate 1. Alternatively, a stream of gas may be blown against the adhesive agent to spread same into a coating of a predetermined thickness.

FIGS. 7-10 show the adhesive agent dispenser 9 and the adhesive agent spreader 10 in a modified form. As shown, a nozzle cover 23 is formed with a gas inlet duct 24, a recess 25 communicating with the gas inlet duct 24, and an opening 27 for allowing a needle 26 to extend therethrough. A balance plate 28 formed with a plurality of apertures 29 arranged annually covers the opening of the recess 25. Arranged in a lower portion of the balance plate 28 is a nozzle member 30 which is formed integrally as its bottom with a discharging cylinder 31. A gap G is defined between the upper end surface of the discharging cylinder 31 and the balance plate 28. 32 is a gas sump formed in the nozzle member 30, 33 is a gas ejecting opening, 34 is a guide hole for the needle 26, 35 is a cutout. The nozzle cover 23, the balance plates 28 and the nozzle 30 are clamped together so as to four a unitary structure by clamping members 36.

Figure 7:
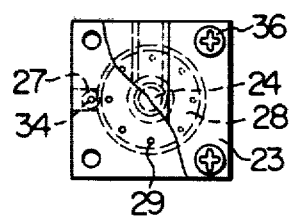
FIG. 7 is a plan view of a modification of the first step.
Figure 8:
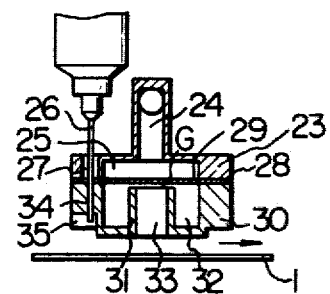
FIG. 8 is a vertical sectional view of the modification of the first step shown in FIG. 7.
Figure 9:
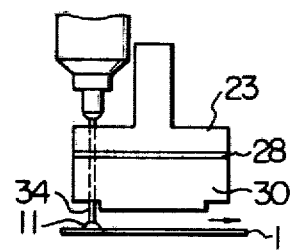
FIGS. 9 and 10 are views in explanation of the modification of the first step shown in FIGS. 7 and 8.

The operation of discharging the adhesive agent and spreading the same on the surface of the base tape 1 by means of the device shown in FIGS. 7 and 8 will be described. The needle 26 having its forward end disposed in the cutout 35 moves downwardly upon receipt of a signal from a control unit (not shown), so that the needle 26 moves downwardly and guided by the guide hole 34 while discharging the adhesive agent through its forward end. The needle 26 stops in a position in which it is spaced apart from the surface of the base tape 1 as shown in FIG. 9. As the needle 26 stops, the adhesive agent 11 is desposited on the surface of the base tape 1. Thereafter, the needle 26 moves upwardly to its original position. At this time, no adhesive agent remains in the needle 26 and all the adhesive agent is applied in drop to the surface of the base tape 1. Upon termination of deposition of the adhesive agent 11 on the base tape 1, the base tape 1 is moved at a distance corresponding to one pitch of the teeth 3a of the sprocket wheel 3 in the direction of an arrow and is brought to a halt, when a compressed air introduced through the gas inlet duct 24 into the recess 25 in the nozzle cover 23 flows into the gas sump 32 through the apertures 29 formed in the balance plate 28. The gas has its pressure increased in the gas sump 32 and is ejected via the gap G and through the gas ejecting opening 33, so that the adhesive agent 11 deposited on the surface of the base tape 1 receives the gas pressure and is spreaded into the adhesive coating 12 of a predetermined thickness as shown in FIG. 10.

Figure 10:
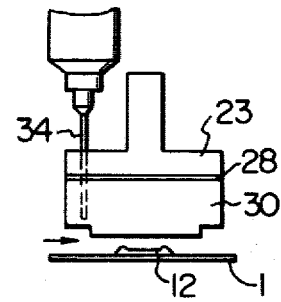

Following the completion of the spreading of the adhesive agent 11, the adhesive agent is again dropped through the needle 26 onto the surface of the base tape 1 in a position spaced apart from the adhesive coating 12 just applied as aforesaid at a distance corresponding to one pitch of the teeth 3a of the sprocket wheel 3 in a direction opposite to the direction of the arrow in FIG. 10. In this modification of the apparatus having an adhesive agent dispensing and spreading device, it is possible to apply the adhesive coating in a condition of a relatively high viscosity and to spread same to form an adhesive coating 12 of a predetermined uniform thickness. Thus the thermoluminescence dosimeter element produced by the method according to the invention has sensitivity which does not vary from element to element because the thermoluminescent material in particulate form evenly adheres to the adhesive coatings.

Figure 11:
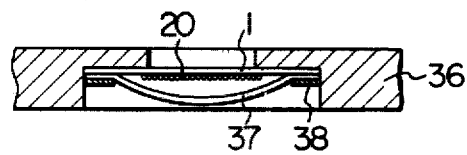
FIG. 11 is a sectional view of a completed thermoluminescence dosimeter element.

FIG. 11 shows in a sectional view a thermoluminescence dosimeter element in a completed form. As shown, the thermoluminescent material 20 is adhering to the surface of the base tape 1 which is attached to an offset portion formed in a recess in a card 26. A cover 37 is arranged on the base tape 1 to cover the thermoluminescent material 20. A ring 38 is force fitted in the recess in the card 36 to force the base tape 1 and the cover 37 against the offset portion in the recess.

According to the modification of the embodiment described hereinabove, the thermoluminescent material in particulate form is uniformly sprayed onto the surface of each adhesive coating formed in a predetermined thickness by a compressed air shot discharged out through the nozzle. This arrangement offers the advantage that all the thermoluminescence dosimeter elements produced by this method have sensitivity which shows no variation from an element to an element because the amount of the particles of the thermoluminescent material disposed on each adhesive coating is constant.

The method according to the invention offers the advantages which are summarized as follows:

(1) The arrangement that the base tape and the masking tape are brought into intimate contact with each other only when the thermoluminescent material in particulate form is sprayed into each adhesive coating on the surface of the base tape, assures the thermoluminescence dosimeter elements to have a uniform shape, since accidental relative displacements between the base tape and the masking tape may be completely avoided.

(2) The thermoluminescent material is sprayed onto each adhesive coating through a fresh portion of the masking tape that has not been used for depositing the thermoluminescent material, and there is no risk that the outer marginal portion of each thermoluminescence dosimeter element might be soiled by the adhesive agent and thermoluminescent material adhering to the masking tape from the previous operations. Thus it is possible to obtain a well-defined, predetermined shape in all the thermoluminescence dosimeter elements at all times.

(3) The arrangement that the thermoluminescence dosimeter elements of a predetermined shape can be formed at regular intervals on the base tape facilitates the operation of stamping out the elements from the tape by punching and severing each element from one another.

(4) In each thermoluminescence dosimeter element produced, a layer of thermoluminescent material is adhered in a uniform and small thickness to an adhesive coating applied in small thickness to the surface of a tape. Thus thermoluminescence dosimeter elements of high sensitivity and reliable performance can be produced continuously on a mass production basis. The elements produced enables the radiation measuring time to be shortened.

(5) The thermoluminescent material and adhesive agent are applied only to those portions of the base tape which are stampted and severed. Thus the cost for producing a thermoluminescence dosimeter element can be reduced because the thermoluminescence material and adhesive agent are not wasted.

What is claimed is:

1. A method of producing a thermoluminescence dosimeter element comprising:
   a first step of applying an adhesive agent to drops at regular intervals to the surface of a base tape moved intermittently and spreading said adhesive agent into an adhesive coating of a small, predetermined thickness;
   a second step of bringing a masking tape formed in its central portion with a series of openings of a predetermined shape at regular intervals into contact with said base tape and spraying from a sprayer particles of thermoluminescent material through one of said openings of said masking tape onto the surface of said adhesive coating to cause said particles to adhere firmly thereto, said masking tape being spaced apart from said base tape in their horizontal runs and intermittently moved in synchronism with the movement of said base tape; and
   a third step of drying said adhesive coating formed on said base tape and said particles of said thermoluminescent material caused to adhere to said adhesive coating whereby said thermoluminescent material can adhere firmly to said base tape.

2. A method as claimed in claim 1, wherein gas is blown against said adhesive agent applied in drops to the surface of said base tape in the first step, to thereby spread said adhesive agent into said adhesive coating of a small thickness.

3. A method as claimed in claim 1, wherein said adhesive agent applied in drops to the surface of said base tape is spread into said adhesive coating of a small thickness by blowing gas against said adhesive agent, said gas being blown by using a gas blowing device comprising a nozzle cover formed with a recess, a balance plate formed with a plurality of apertures for covering an opening of said nozzle cover, and a nozzle member formed with a gas sump and a cylindrical gas discharge opening secured to cover said balance plate, the gas supplied to said recess of said nozzle cover being discharge through said apertures of the balance plate, said gas sump, a gap defined between said cylindrical gas discharge opening and said balance plate and said cylindrical gas discharge opening.

* * * * *